United States Patent
Nelson

(10) Patent No.: US 9,478,987 B2
(45) Date of Patent: Oct. 25, 2016

(54) POWER OSCILLATION DAMPING EMPLOYING A FULL OR PARTIAL CONVERSION WIND TURBINE

(75) Inventor: Robert J. Nelson, Orlando, FL (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 1048 days.

(21) Appl. No.: 12/615,387

(22) Filed: Nov. 10, 2009

(65) Prior Publication Data

US 2011/0109085 A1    May 12, 2011

(51) Int. Cl.
 *H02J 3/24* (2006.01)
 *H02J 3/38* (2006.01)
 *H02P 9/10* (2006.01)
 H02P 101/15 (2015.01)

(52) U.S. Cl.
 CPC ............ *H02J 3/24* (2013.01); *H02P 9/102* (2013.01); *H02J 3/386* (2013.01); *H02P 2101/15* (2015.01); *Y02E 10/763* (2013.01)

(58) Field of Classification Search
 CPC .......... H02J 3/24; H02J 3/386; H02P 9/102; H02P 2101/15; Y02E 10/763
 USPC .................. 700/287, 292, 297, 286
 See application file for complete search history.

(56) References Cited

U.S. PATENT DOCUMENTS

| | | | |
|---|---|---|---|
| 3,946,242 A * | 3/1976 | Wilkerson | 307/45 |
| 3,974,395 A * | 8/1976 | Bright | 290/44 |
| 4,420,692 A * | 12/1983 | Kos et al. | 290/44 |
| 4,435,647 A * | 3/1984 | Harner et al. | 290/44 |
| 4,454,426 A * | 6/1984 | Benson | 290/1 R |
| 4,982,147 A * | 1/1991 | Lauw | 318/729 |
| 4,994,684 A * | 2/1991 | Lauw et al. | 290/52 |
| 5,028,804 A * | 7/1991 | Lauw | 290/40 C |
| 5,225,712 A | 7/1993 | Erdman | |
| 5,424,627 A * | 6/1995 | Clark et al. | 323/210 |
| 5,804,949 A * | 9/1998 | Othman et al. | 323/209 |
| 5,909,105 A | 6/1999 | Noroozian | |
| 6,137,187 A * | 10/2000 | Mikhail et al. | 290/44 |

(Continued)

FOREIGN PATENT DOCUMENTS

| CN | 1964153 A | 5/2007 |
|---|---|---|
| DE | 10022974 A1 | 11/2001 |

(Continued)

OTHER PUBLICATIONS

Beck, G.; Breuer, W.; Povh, D.; Retzmann, D. and Teltsch, E., Use of FACTS and HVDC for Power System Interconnection and Grid Enhancement:, Jan. 30-Feb. 1, 2006, Power-Gen, Adu Dhabi International Exhibition and Conference Center.*

(Continued)

*Primary Examiner* — Mohammad Ali
*Assistant Examiner* — Kelvin Booker

(57) ABSTRACT

A wind turbine (8) for controlling power oscillations on a grid of a power system (28). The wind turbine (8) comprises rotor blades (12) for turning by the wind, an electric generator (20) rotatably coupled to the rotor blades (12), a power converter (24) responsive to electricity generated by the electric generator (20), the power converter (24) for converting the generated electricity to a frequency and voltage suitable for supply to the power grid (28), and the power converter for regulating voltage on the grid supplemented by modulating real power for damping the power oscillations.

12 Claims, 2 Drawing Sheets

(56) References Cited

U.S. PATENT DOCUMENTS

| | | | |
|---|---|---|---|
| 6,420,795 B1* | 7/2002 | Mikhail et al. | 290/44 |
| 6,566,764 B2* | 5/2003 | Rebsdorf et al. | 290/44 |
| 6,600,240 B2* | 7/2003 | Mikhail et al. | 307/85 |
| 6,670,721 B2* | 12/2003 | Lof | F03D 9/003 290/2 |
| 6,693,409 B2* | 2/2004 | Lynch et al. | 323/208 |
| 6,819,087 B2* | 11/2004 | Delmerico et al. | 322/58 |
| 6,847,128 B2* | 1/2005 | Mikhail et al. | 290/44 |
| 6,856,038 B2* | 2/2005 | Rebsdorf et al. | 290/44 |
| 6,856,039 B2* | 2/2005 | Mikhail et al. | 290/44 |
| 7,095,131 B2* | 8/2006 | Mikhail et al. | 290/44 |
| 7,345,373 B2* | 3/2008 | Delmerico et al. | 290/44 |
| 7,423,411 B2* | 9/2008 | Sihler | 322/19 |
| 7,528,496 B2* | 5/2009 | Fortmann | 290/44 |
| 7,622,816 B2* | 11/2009 | Stahlkopf | F03D 9/005 290/44 |
| 7,652,387 B2* | 1/2010 | Corcelles Pereira | H02J 3/18 290/44 |
| 7,652,394 B2* | 1/2010 | Hirst | 307/73 |
| 7,761,190 B2* | 7/2010 | Delmerico et al. | 700/297 |
| 7,800,243 B2* | 9/2010 | Bendixen et al. | 290/44 |
| 7,804,184 B2* | 9/2010 | Yuan | H02J 3/386 290/44 |
| 7,830,127 B2* | 11/2010 | Corcelles Pereira | H02J 3/1807 322/24 |
| 7,851,934 B2* | 12/2010 | Nyborg | 290/44 |
| 7,911,072 B2* | 3/2011 | Nyborg | 290/44 |
| 7,939,954 B2* | 5/2011 | Ruiz Flores et al. | 290/44 |
| 7,939,970 B1* | 5/2011 | Walling et al. | 307/84 |
| 8,041,466 B2* | 10/2011 | Helle et al. | 700/287 |
| 8,044,527 B2* | 10/2011 | Mari et al. | 290/44 |
| 8,072,190 B2* | 12/2011 | Tormanen et al. | 322/24 |
| 8,080,891 B2* | 12/2011 | Schramm et al. | 290/44 |
| 8,106,540 B2* | 1/2012 | Larsen et al. | 307/105 |
| 8,150,556 B2* | 4/2012 | Jiao et al. | 700/292 |
| 8,174,137 B2* | 5/2012 | Skaare | F03D 7/0224 290/43 |
| 8,310,074 B2* | 11/2012 | Larsen et al. | 290/44 |
| 8,373,312 B2* | 2/2013 | O'Brien | H01L 31/02021 307/140 |
| 8,390,138 B2* | 3/2013 | Fortmann et al. | 290/44 |
| 8,401,710 B2* | 3/2013 | Budhraja et al. | 700/291 |
| 8,659,178 B2* | 2/2014 | Arlaban Gabeiras et al. | 290/44 |
| 2002/0079706 A1* | 6/2002 | Rebsdorf et al. | 290/55 |
| 2002/0105189 A1* | 8/2002 | Mikhail et al. | 290/44 |
| 2003/0006613 A1* | 1/2003 | Lof et al. | 290/44 |
| 2004/0026929 A1* | 2/2004 | Rebsdorf et al. | 290/44 |
| 2004/0094964 A1* | 5/2004 | Mikhail et al. | 290/44 |
| 2004/0124812 A1* | 7/2004 | Delmerico et al. | 322/29 |
| 2004/0207207 A1* | 10/2004 | Stahlkopf | F03D 9/005 290/44 |
| 2004/0207208 A1* | 10/2004 | Mikhail et al. | 290/44 |
| 2005/0253396 A1* | 11/2005 | Mikhail et al. | 290/44 |
| 2006/0147306 A1* | 7/2006 | Zheng et al. | 416/1 |
| 2007/0097565 A1 | 5/2007 | Oohara et al. | |
| 2007/0177319 A1* | 8/2007 | Hirst | 361/85 |
| 2008/0106099 A1 | 5/2008 | Ichinose et al. | |
| 2008/0111380 A1 | 5/2008 | Delmerico et al. | |
| 2008/0150282 A1* | 6/2008 | Rebsdorf | F03D 7/0284 290/44 |
| 2008/0157530 A1* | 7/2008 | Corcelles Pereira et al. | 290/44 |
| 2009/0079191 A1* | 3/2009 | Mari et al. | 290/43 |
| 2009/0174186 A1* | 7/2009 | Nyborg | 290/44 |
| 2009/0174187 A1* | 7/2009 | Nyborg | 290/44 |
| 2009/0200872 A1* | 8/2009 | Johansson | 307/102 |
| 2009/0206606 A1* | 8/2009 | Jorgensen | F03D 7/0224 290/44 |
| 2009/0254223 A1* | 10/2009 | Helle et al. | 700/287 |
| 2009/0273185 A1* | 11/2009 | Ruiz Flores et al. | 290/44 |
| 2010/0045040 A1* | 2/2010 | Bendixen et al. | 290/44 |
| 2010/0052322 A1* | 3/2010 | Fortmann et al. | 290/44 |
| 2010/0084865 A1* | 4/2010 | Corcelles Pereira et al. | 290/44 |
| 2010/0133823 A1* | 6/2010 | Schramm et al. | 290/44 |
| 2010/0143115 A1* | 6/2010 | Kerr | 416/1 |
| 2010/0219634 A1* | 9/2010 | Arlaban Gabeiras et al. | 290/44 |
| 2010/0237834 A1* | 9/2010 | Alonso Sadaba | F03D 7/0284 323/205 |
| 2010/0286837 A1* | 11/2010 | Jiao et al. | 700/292 |
| 2010/0292852 A1* | 11/2010 | Gertmar et al. | 700/287 |
| 2011/0012352 A1* | 1/2011 | Nelson | F03D 7/0272 290/44 |
| 2011/0040414 A1* | 2/2011 | Nyborg | 700/280 |
| 2011/0089693 A1* | 4/2011 | Nasiri | F03D 7/0272 290/44 |
| 2011/0101689 A1* | 5/2011 | Larsen et al. | 290/44 |
| 2011/0130889 A1* | 6/2011 | Khajehoddin et al. | 700/298 |
| 2011/0215775 A1* | 9/2011 | Engelhardt | H02J 3/26 323/205 |
| 2011/0285130 A1* | 11/2011 | Thisted | 290/44 |
| 2011/0304141 A1* | 12/2011 | Van Dyck | H02J 3/1878 290/44 |
| 2012/0032440 A1* | 2/2012 | Schindele et al. | 290/7 |
| 2012/0061963 A1* | 3/2012 | Thisted | 290/44 |
| 2012/0104754 A1* | 5/2012 | Rudolf | F03D 7/0284 290/44 |
| 2012/0143537 A1* | 6/2012 | Nielsen | 702/60 |
| 2012/0161444 A1* | 6/2012 | Tarnowski | F03D 7/0276 290/44 |
| 2012/0200087 A1* | 8/2012 | Schindele et al. | 290/44 |
| 2012/0205981 A1* | 8/2012 | Varma et al. | 307/64 |
| 2012/0271475 A1* | 10/2012 | Wang et al. | 700/295 |
| 2012/0278015 A1* | 11/2012 | Budhraja et al. | 702/62 |
| 2013/0027994 A1* | 1/2013 | Nelson et al. | 363/40 |
| 2016/0197482 A1* | 7/2016 | Varma | H02J 3/383 307/64 |

FOREIGN PATENT DOCUMENTS

| | | | | |
|---|---|---|---|---|
| EP | 1808947 A2 | | 7/2007 | |
| JP | 2005025026 A | * | 1/2005 | G09B 9/00 |
| WO | 2005025026 A1 | | 3/2005 | |
| WO | WO 2005025026 A1 | * | 3/2005 | H02J 3/28 |

OTHER PUBLICATIONS

Bongiorno, M.; Svensson, J. and Angquist, L., "Single-Phase VSC Based SSSC for Subsynchronous Resonance Damping", Jul. 2008, IEEE Transactions on Power Delivery, vol. 23, No. 3.*

El-Moursi, M.S., Bak-Jensen, B. and Abdel-Rahman, M.H., "Novel STATCOM Controller for Mitigating SSR and Damping Power System Oscillations in a Series Compensated Wind Parks", 2009, IEEE Xplore.*

Fujita, H.; Akagi, H.; and Watanabe, Y., "Dynamic Control and Performance of a Unified Power Flow Controller for Stabilizing an AC Transmission System", Jul. 2006, IEEE Transactions on Power Electronics, vol. 21, No. 4.*

Jesus, F.D.; Watanabe, E.H.; Souza, L.F.W. and Alves, Jr., J.E., "SSR and Power Oscillation Damping Using Gate-Controlled Series Capacitors (GCSC)", Jul. 2007, IEEE Transactions on Power Delivery, vol. 22, No. 3.*

Khaparde, S.A. and Krishna, V., "Simulation of Unified Static VAR Compensator and Power System Stabilizer for Arresting Subsynchronous Resonance", May 1997, 20th International Conference on Power Industry Computer Applications.*

Miri, A.M.; Sihler, C. and Zoller, T., "Active Damping of Torsional Modes in Turbine-Generator Shafts", Jun. 2009.*

Mohammadpour, H.A.; Reza, M.; Pahlavani, A. and Shoulaie, A., "On Control of Gate Controlled Series Capacitor for SSR and Power Oscillation Damping", 2009, 6th International Conference-Workshop on Compatibility and Power Electronics.*

Petersson, A., "Analysis, Modeling and Control of Doubly-Fed induction Generators for Wind Turbines", 2005, Doctorial Thesis in Division of Electric Power Engineering, Department of Energy and Environment, Chalmers Univeristy of Technology.*

Qiao, W.; Harley, R.G.; and Venayagamoorthy, G.K., "Coordianated Reactive Power Control of a Large Wind Farm and a STATCOM Using Heuristic Dynamic Programming", Jun. 2009, IEEE Transactions on Energy Conversion, vol. 24, No. 2.*

Rawn, B.G.; Lehn, P.W.; and Maggiore, M., "A Control Methodology to Mitigate the Grid Impact of Wind Turbines", Jun. 2007, IEEE Transactions on Energy Conversion.*

(56) References Cited

OTHER PUBLICATIONS

Jauch, C., "Stability and Control of Wind Farms in Power Systems", Oct. 2006, Riso National Laboratory.*

Suul, J.A.; Uhlen, K. and Undeland, T., "Variable Speed Pumped Storage Hydropower for Integration of Wind Energy in Isolated Grids-Case Description and Control Strategies", Jun. 2008, Nordic Workshop on Power and Industrial Electronics.*

Tang, G., "Damping Subsynchronous Resonance Oscillations Using a VSC HVDC Back-to-Back System", Jul. 2006, Thesis for Department of Electrical Engineering, University of Saskatchewan.*

Zhongda, L.; Fengxia, X. and Xuefeng, D., "Periodic Disturbance Restraint Based on Adaptive Finite-Demensional Repetitive Control", Dec. 2008, $2^{nd}$ International Symposium on Systems and Control in Aerospace and Astronautics (ISSCAA 2008).*

Snyder, A.F., "Inter-Area Oscillation Damping with Power System Stabilizers and Synchronized Phasor Measurements", Feb. 2007, Thesis for Master of Science in Electrical Engineering, Virginia Polytechnic Institute and State University.*

Pal, B. and Chaudhuri, B., "Robust Control in Power Systems: Chapter 2", 2005, ISBN: 978-0-387-25949-9.*

Brownlees, S.; Fox, B.; Flynn, D. and Littler, T., "Wind Farm Induced Oscillations", Sep. 2006, Proceedings of the $41^{st}$ International Universities Power Engineering Conference, UPEC '06.*

Dolan, D.S.L. and Lehn, P.W., "Simulation Model of Wind Turbine 3p Torque Oscillations due to Wind Shear and Tower Shadow", Sep. 2006, IEEE Transactions on Energy Conversion, vol. 21, No. 3.*

Fernandez, R.D.; Battaiotto, P.E. and Mantz, R.J., "Wind farm Non-Linear Control for Damping Electromechanical Oscillations of Power Systems", Mar. 2007, Renewable Energy 33, 2258-2265.*

Fernandez, R.D.; Mantz, R.J. and Battaiotto, P.E., "Potential Contribution of Wind Farms to Damp Oscillations in Weak Grids with High Wind Penetration", Nov. 2006, Renewable and Sustainable Energy Review, 12, 1692-1711.*

Fernandez, R.D.; Mantz, R.J. and Battaiotto, P.E., "Impact of Wind Farms on a Power System, An Eigenvalue Analysis Approach", Mar. 2006, Renewable Energy, 32, 1676-1688.*

Ledesma and Gallardo; Contribution of variable-speed wind farms to damping of power system oscillations; PowerTech 2007; 978-1-4244-2190-9/07 2007 IEEE; pp. 190-194; downloaded on Nov. 1, 2008 from IEEE Xplore.

Arsoy, Liu, Chen, Yang, Crow and Ribeiro; Dynamic Performance of a Static Synchronous Compensator with Energy Storage; 0-7803-6672-7/01 2001 IEEE; pp. 605-610.

Bamasak and Abido; Robust Coordinated Design of PSS & Statcom Controllers for Damping Power System Oscillation; 15th PSCC, Liege, Aug. 22-26, 2005, Session 32, Paper 5; pp. 1-7.

* cited by examiner

POWER OSCILLATION DAMPING EMPLOYING A FULL OR PARTIAL CONVERSION WIND TURBINE

FIELD OF THE INVENTION

The present invention relates generally to control of power systems and more specifically to power oscillation damping employing a full-conversion or partial conversion wind turbine or a doubly-fed induction generator wind turbine.

BACKGROUND OF THE INVENTION

In most cases, there is a phase angle difference between a sinusoidal current supplied to a power grid by an alternating current generator and a voltage at the generator's terminals. This phase angle difference between the voltage and the current is due to the nature of the load on the power grid. For a purely resistive load (i.e., having no energy storage properties) the voltage and current are in phase, i.e., the current and voltage reverse their polarity simultaneously and a direction of power remains fixed and does not reverse.

For a purely reactive load the current and voltage are 90 degrees out of phase and the net power flow is zero as the power flows to and returns from the load due to the energy storage features of the reactive load. If the load is purely inductive, the current lags the voltage by 90 degrees. A lag angle is between 0 and 90 degrees for a load that is both inductive and resistive. For a purely capacitive load the current leads the voltage by 90 degrees. A lead angle is between 0 degrees and 90 degrees for a load with both resistive and capacitive properties. Thus the magnitude of the phase angle difference depends on the resistance, inductance and capacitance of the load to which the generator supplies power and on the characteristics and operating point of the generator.

For a load with both reactive and resistive properties, the current phase angle (relative to the voltage phase angle) can be resolved into an in-phase component (i.e., in-phase with the voltage) and an out-of-phase component (i.e., a 90 degrees out-of-phase with the voltage). Thus the component of the current that is in phase with the voltage results in the delivery of real or active power into the load. The component of the current that is phase shifted by 90 degrees from the voltage, referred to as reactive power, performs no useful work. The energy associated with this current flows from the generator to the load and then back to the generator, resulting in a net zero energy at any point in the circuit.

The generation and control of reactive power in an electrical transmission system is important to the overall power system efficiency and stability. Capacitors, capacitive loads and capacitive compensators are considered to generate reactive power. Inductors, inductive loads (e.g., transformers and motors) and inductive compensators are considered to consume reactive power. Also, lightly loaded transmission lines generate reactive power and heavily loaded lines consume reactive power.

Electric power transmission systems are designed recognizing that the three power system parameters of impedance, voltage and phase angle between the current and voltage cannot be controlled fast enough to accommodate dynamic system conditions. Furthermore, available control devices usually compensate or control only one of the three variables. Thus transmission systems having been designed with fixed or mechanically-switched series and shunt reactive compensations, together with voltage regulating and phase-shifting transformer tap changers, to optimize line impedance, minimize voltage variation, and control power flow under steady-state or slowly-changing load conditions. The dynamic system problems have been typically addressed by over-design, i.e., designing the system with generous stability margins to recover from worst case contingencies resulting from faults, line and generator outages, and equipment failures. This practice of over design results in the under utilization of the transmission system.

In recent years, energy demands, environmental considerations, right-of-way access, and cost issues have delayed the construction of both generation facilities and new transmission lines. This has necessitated a change in the traditional power system concepts and practices; better utilization of existing power systems has become imperative. But higher utilization of power transmission systems, without an appreciable degradation in the reliability of the supply of electric power, is possible only if the power flow can be controlled rapidly following dynamic system disturbances.

Electric power is provided by a rotating generator driven by a turbine. The mechanical output power of the turbine cannot be changed quickly to balance the mechanical power with a rapidly changing electrical power demand. Consequently, the generators are forced to accelerate or decelerate responsive to changes in power demand. For example, an electrical demand greater than the electrical generation causes the generator to slow down and the frequency of the electrical energy on the distribution system may drop. Conversely, when excess electrical energy is available the generator accelerates and the electrical system frequency increases.

This change in the generator's rotational speed results in a corresponding angular position change (also referred to as a rotor power angle change), with respect to a constant angular position maintained elsewhere on the transmission line by other generators, i.e., typically a large, distant, undisturbed generator also referred to as an "infinite" bus. The angular position change between generators alters the amount of electric power transmitted. Once the disturbance is over (e.g., a fault cleared, new transmission system configuration, new power generation level or new load demand established) the disturbed generators try to reach a new angular position appropriate to the new steady-state condition of the power system. However, the generators together with the associated turbines have significant rotational inertia and, for this reason the new angular position is usually reached only after an "overshoot" or oscillation period. These transient angular changes and oscillations, of course, manifest themselves as transient electric power changes and oscillations. In the extreme case, these transient changes cannot be stabilized; the equilibrium between the available mechanical power and transmitted electric power cannot be reestablished and the angular "overshoot" increases. The generator then accelerates until it is automatically shut down when a maximum rotational speed is reached. The angular oscillation may also continue or even increase due to insufficient oscillation damping in the power system. These undamped oscillations may ultimately cause the power system to be shut down by tripping of protective devices.

One measure of the ability of a power system to provide electric power to meet load demand is power system "stability." "Transient stability" refers to the capability of the power system to recover normal operation following a major disturbance (fault, loss of generation, etc.). "Dynamic stability" refers to the capability of the power system to recover normal operation following a minor disturbance that initiates power oscillations. Thus a dynamically stable power system has positive damping to damp or remove the power oscillations.

Various devices are in use to stabilize bulk-power transmission and distribution systems and to improve the transient and dynamic stability of the power system. These devices, referred to generally as flexible AC transmission system (FACTS) devices can provide rapid voltage regulation and power flow control. FACTS devices include: static-var compensators (SVC), static synchronous compensators (STATCOMS), and thyristor-controlled series capacitors (TSCSs). Use of these devices to limit effects of power system impedance changes permits loading of the transmission facilities to levels approaching their ultimate thermal capacity. These devices may regulate system voltage and/or provide power modulation to damp electromechanical oscillations. In any case, the FACTS devices control the voltage, impedance or phase angle on the power system.

STATCOM devices lack any substantial real energy storage and are simply voltage-sourced inverters that regulate voltage of the grid via a step up transformer. In present devices, only transient energy storage is provided by a relatively small DC capacitor that is used to exchange reactive power between phase conductors of the power system. Since the STATCOM can only regulate voltage, the STATCOM is limited in the degrees of freedom and sustained power damping oscillation actions that it can contribute to the grid.

For example, one STATCOM was developed specifically for power oscillation damping for inter-area power oscillations by modulating the voltage at the interconnection. It is known that inter-area power oscillations occur on transmission systems with long lines and large physical distances between major generation sources. Typically, after a disturbance, groups of generators in a first geographic region swing against another group of generators in a second geographic region separated from the first region by a series of long transmission lines. Normally, these oscillations are of a very low frequency (typically between 0.1 and 0.7 Hz) and are poorly damped in the absence of supplemental damping.

Inter-area power oscillations are a particularly common phenomenon in the US western states, Canada, and other regions with low power generation density and long transmission lines between generating units. To damp these inter-area oscillations, synchronous generators in these regions are typically required to have power system stabilizers (PSSs) to provide supplemental damping to ensure the oscillations are damped before they cause system instabilities.

Wind turbines exploit wind energy by converting the wind energy to electricity for distribution to users. Several factors must be considered in identifying a wind turbine site and designing the turbine, including, tower height, control systems, number of blades, and blade shape. Wind turbines are typically sited at isolated locations where the grid may be regarded as relatively "weak" due to the few generating plants and long distances between plants. A "weak" system may be characterized by a relatively low short circuit strength, e.g., less than about 10 kA, and/or a variations in voltage at different points on the system.

The rotor of a fixed-speed wind turbine is turned by the wind-driven blades and operates through a gear box (i.e., a transmission) at a fixed rotational speed. The fixed-speed wind turbine is typically connected to the grid through an induction (asynchronous) generator that generates real power. The rotor and its conductors rotate faster than the rotating flux applied to the stator from the grid (i.e., higher than the synchronous speed). At this higher speed, the direction of the rotor current is reversed, reversing the counter EMF generated in the stator windings, and by generator action causing current (and real power) to flow from the stator windings. The frequency of the generated stator voltage will be the same as the frequency of the applied stator voltage providing the excitation. The induction generator may also use a capacitor bank for reducing reactive power consumption from the power system.

The fixed-speed wind turbine is simple, reliable, low cost and well-proven. But its disadvantages include uncontrollable reactive power consumption (as required to generate the stator rotating flux), mechanical stresses, limited power quality control and relatively inefficient operation. In fact, wind speed fluctuations result in mechanical torque fluctuations that then result in fluctuations in the electrical power on the grid.

In contrast, the rotational speed of a variable speed wind turbine can be continuously adapted to the wind speed, with the blade speed maintained at a relatively constant value corresponding to a maximum electrical power output through the use of a gear box disposed between the wind turbine rotor and the generator rotor. The variable speed wind turbine is typically equipped with a synchronous generator (the output of which is a variable frequency AC) and connected to the grid through a power converter system that rectifies the incoming variable AC to DC and inverts the DC to fixed frequency 60 Hz AC. Variable speed wind turbines have become widespread due to their increased efficiency over fixed speed wind turbines.

The present invention relates to a transmission system power flow controller that employs wind turbine-generated electricity to control and stabilize power flow on a transmission line.

BRIEF DESCRIPTION OF THE DRAWINGS

The invention is explained in the following description in view of the drawings that show.

DETAILED DESCRIPTION OF THE INVENTION

Figure 1:
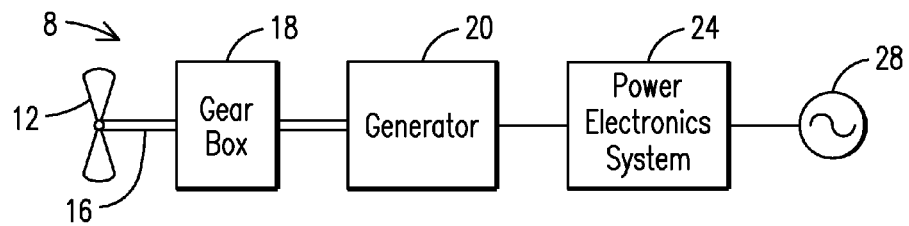
FIG. 1 is a block diagram of a variable speed wind turbine system.

Before describing in detail the particular methods and apparatuses related to power oscillation damping in a power system in accordance with various aspects of the present invention, it should be observed that the present invention, in its various embodiments, resides primarily in a novel and non-obvious combination of hardware, method steps and software elements related to said method and apparatus. Accordingly, the hardware, method steps and software elements have been represented by conventional elements in the drawings, showing only those specific details that are pertinent to the present invention so as not to obscure the disclosure with structural details that will be readily apparent to those skilled in the art having the benefit of the description herein.

The following embodiments are not intended to define limits of the structures or methods of the invention, but only to provide exemplary constructions. The embodiments are permissive rather than mandatory and illustrative rather than exhaustive.

FIG. 1 illustrates components of an exemplary variable speed wind turbine 8, including rotor blades 12 for converting wind energy to rotational energy for driving a shaft 16 connected to a gearbox 18. The wind turbine also includes a structural support component, such as a tower and a rotor pointing mechanism, not shown in FIG. 1. The gearbox 18 converts low speed rotation to high speed rotation, as required for driving a generator 20 to generate electricity.

Electricity generated by the generator 20 is supplied to a power electronics system 24 to adjust the generator output voltage and/or frequency for supply to a grid 28. Generally, the power electronics system includes features that are important for the grid, including controllable active power flow and voltage regulation and improved network voltage stability.

Figure 2:
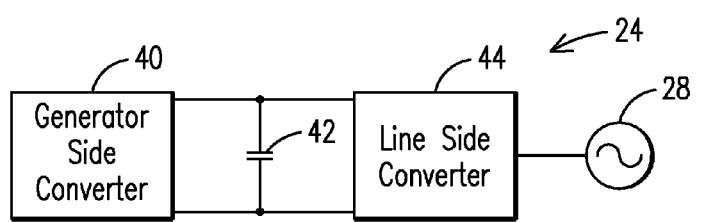
FIG. 2 is a block diagram of the power electronics system of FIG. 1

One embodiment of the power electronics system 24 is illustrated in FIG. 2, including a generator-side converter 40 for converting the generated AC electricity to DC and an output capacitor 42 for filtering the DC current. DC current is supplied to a line side converter 44 (inverter) for producing 60 Hz AC power supplied to the grid 28. The amount of power available from the wind turbine is determined by operation of the generator-side converter.

Different generators 20 are used for different wind turbine applications, including both asynchronous (induction) generators (e.g., squirrel cage, wound rotor and doubly-fed induction generators) and synchronous generators (e.g., wound rotor and permanent magnet synchronous generators). Advantageously, the induction generators are relatively simple and inexpensive, but disadvantageously the stator requires a reactive magnetizing current and therefore consumes reactive power.

The power electronics system 24 employs different elements for different turbine installations, including rectifiers, inverters and frequency converters (e.g., back-to-back, multilevel, tandem, matrix and resonant converters).

In the doubly-fed induction generator (DFIG), utility grid supplied electricity (typically three phase AC) energizes the windings of the generator stator. The wind-driven blade assembly of the wind turbine generates the mechanical force to turn the rotor shaft, such as through the gear box. The magnetizing current and the low frequency (slip) power are supplied to the rotor from a rotor converter. The rotor converter controls the active and reactive power by controlling the rotor current components. The DFIG is typically used with a partial converter (with about one-third the capacity of a full converter).

One type of converter employed in a variable speed wind turbine, referred to as a full converter or back-to-back converter, comprises a power converter connected to the generator side, a DC link and a power converter connected to the grid. The full converter converts an input voltage, i.e., a fixed frequency alternating current, a variable frequency alternating current (due to the variable wind speed) or a direct current, as generated by the wind turbine, to a desired output frequency and voltage as determined by the grid that it supplies. Typically using thryistors, the full converter converts the electricity produced by the generator to DC and transfers this energy to the DC link. From the DC link the electricity is supplied to the grid-side active converter where it is transformed to fixed frequency AC electricity and supplied to the grid. FIG. 2 depicts elements of a full converter.

The present invention provides a new, non-obvious and useful wind turbine and a method for using a wind turbine to effectively damp power system oscillations using either voltage regulation alone when the wind turbine is on-line (irrespective of whether the wind turbine is producing real power), or voltage regulation and active power control when the turbine is producing active (real) power, or active power regulation when the turbine is producing real power, with or without also regulating voltage. These power oscillations are created as system generators establish a new angular position, as explained above, after a system disturbance. The power oscillations damped by the present invention are not intended to refer to oscillations initiated by wind turbines.

Voltage regulation affects power through the equation:

$$P=[(V_{GEN})(V_{SYSTEM})(\sin \delta)]/X$$

where X is the impedance of the grid and δ is the phase angle (also referred to as the power angle) between the generator voltage ($V_{GEN}$) and the system or grid voltage ($V_{SYSTEM}$). The amount of real or active power generated by the wind turbine can also be controlled, as described in detail below, to directly damp power system oscillations.

A paper entitled, "Contribution of Variable-speed Wind Farms to Damping of Power System Oscillations" by Ledesma and Gallardo (PowerTech 2007), describes power oscillation damping by modulating the real power using a variable speed wind turbine, but the authors do not describe the essence of the present invention, voltage regulation alone when real power is not available or voltage regulation supplemented by real power modulation when real power is available.

As long as wind turbines are sited on the fringes of a power system, where most tend to be located today, they may not be ideally located to provide power oscillation damping since they may not be located proximate or between large generating stations. But as wind turbines become more prevalent, they may be sited near or between major generating stations. For example, in the western United States, where large hydroelectric and coal plants are employed to generate electricity, wind farms may be established between these generating stations. Furthermore, power oscillation damping using wind turbines may become a required capability once it is generally known this capability is available to damp inter-area oscillations. There has been at least one notorious system-wide outage in the region operated under the auspices of the Western Electric Coordinating Council (WECC) that was attributed to inadequate power oscillation damping.

The present invention implements power oscillation damping in the controls of the wind turbine system-side (also referred to as the line-side) converter, using either voltage control only (when the turbine is not producing real power) or voltage control supplemented by active power control (when the turbine is producing real power), using a supplemental stabilizing signal to control the regulated voltage as described below. The line side converter can also regulate voltage, which can be used to damp the power oscillations.

This control strategy of the invention should be sufficiently general to accommodate the various controls that are used to implement power oscillation damping (e.g., frequency, electric power, accelerating power, and integral of accelerating power). These features further differentiate the present invention from the scheme described in the Ledesma and Gallardo paper. As noted above, the paper considers damping using only real power modulation, not using voltage regulation. The scheme of the present invention is superior, since real power modulation is available when wind turbines are producing real power, while voltage regulation is available whenever a wind turbine is on-line, irrespective of whether it is producing real power for the grid (e.g., when the turbine outputs are curtailed because there is inadequate wind for real power production).

Figure 3:
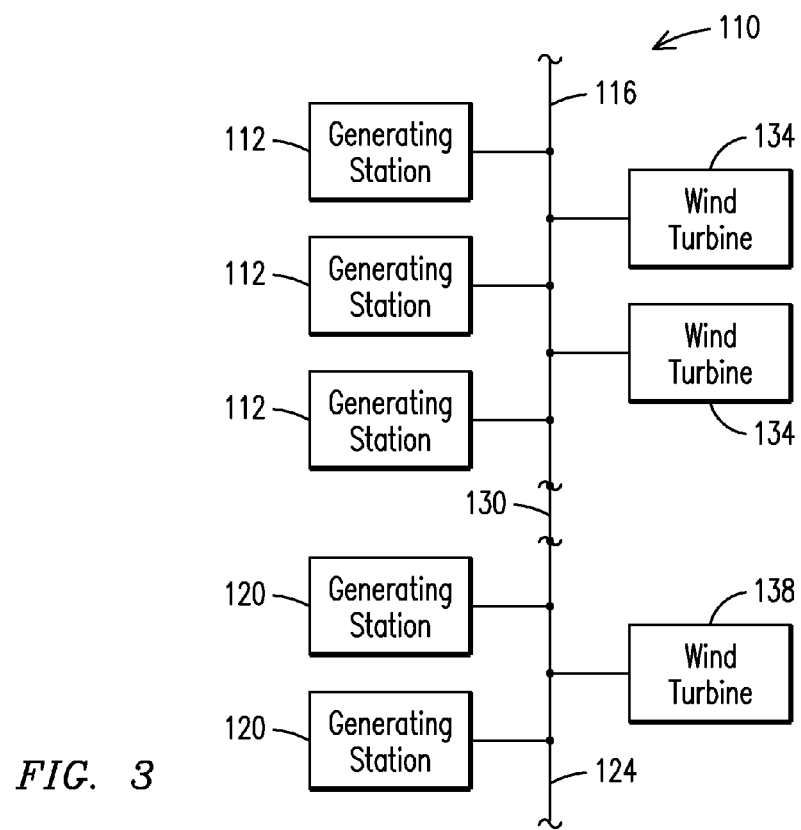
FIG. 3 is a line diagram of an electrical power system to which the teachings of the present invention can be applied

FIG. 3 is a single line schematic diagram of an electrical power system or power grid 110 including generating stations 112 supplying electricity to a transmission line 116 (via intermediate transformers and associated equipment not shown). Generating stations 120 supply electricity to a transmission line 124 also via intermediate transformers and associated equipment not shown in the figure. The transmission lines 116 and 124 are interconnected through a transmission tie line 130. Wind turbines 134 supply power to the transmission line 116 and a wind turbine 138 supplies power to the transmission line 124.

It is believed that a device with power oscillation damping capabilities can be enhanced if the device includes a source of real energy, allowing modulation of the power angle (i.e., the angle between the generator voltage and the system voltage) as well as the voltage (the voltage at the correct phase angle). Consequently, oscillation damping devices have been proposed with battery, super-capacitor and superconducting magnetic energy storage devices. Various control strategies have been developed to take advantage of this enhanced capability.

According to one embodiment of the invention, each of the wind turbines 134 and 138 comprises a full converter wind turbine that appears, from the perspective of the power grid 110, to be either a control device that is not supplying real energy (such as during a curtailment when the wind turbine is not producing real power but is available for regulating the voltage) or a control device that supplies real energy (such as when the wind turbine is producing power for the grid). The full converter can regulate voltage independently of real power; voltage regulation requires no real energy other than to compensate for real losses.

Consequently, in addition to supplying real power to the power grid 110, a suitably controlled wind turbine 134 or 138 can provide an ancillary function of power oscillation damping, with or without energy storage, as appropriate. Thus if the wind turbine can store energy, it can use the stored energy to damp power oscillations even when the turbine is not producing energy. Further, the wind turbine can use voltage control alone to damp oscillations when it is not producing energy for the grid.

Figure 4:
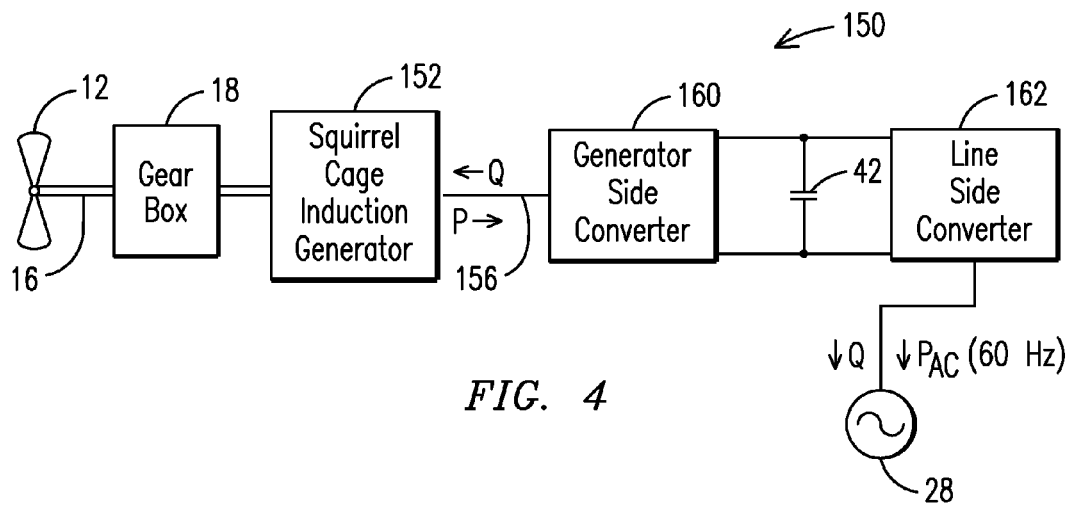
FIGS. 4 and 5 are block diagrams of wind turbines to which the teachings of the present invention can be applied.

FIG. 4 illustrates a wind turbine 150 comprising a squirrel cage induction generator 152 (or another type induction generator) that consumes but cannot produce magnetizing current. Thus a conductor 156 extending from the generator 152 receives magnetizing current from a generator side converter 160 and supplies real power P (at a variable frequency dependent on the rotational speed of the induction generator rotor) to the generator side converter 160. The generator side converter 160 rectifies the variable frequency signal to DC. The DC power is supplied to a line-side converter 162 that outputs real power (P) at 60 Hz and regulates system voltage. If one of the wind turbines 134 and 138 of FIG. 3 is configured as the wind turbine 150 of FIG. 4 the output of the line side converter 162 can be used to damp power oscillations on the transmission lines 116 and 124 and the tie line 130 of FIG. 3. The power oscillations are damped by controlling one or more of the real output power ($P_{AC}$) or the voltage output. It is noted that changing the voltage of the wind turbine changes the output power.

A synchronous generator (such as a permanent magnet synchronous generator) can be substituted for the induction generator 152 with the same inventive results. The generator side converter 160 can be simplified in this embodiment as it is not required to provide magnetizing current to the generator.

Figure 5:
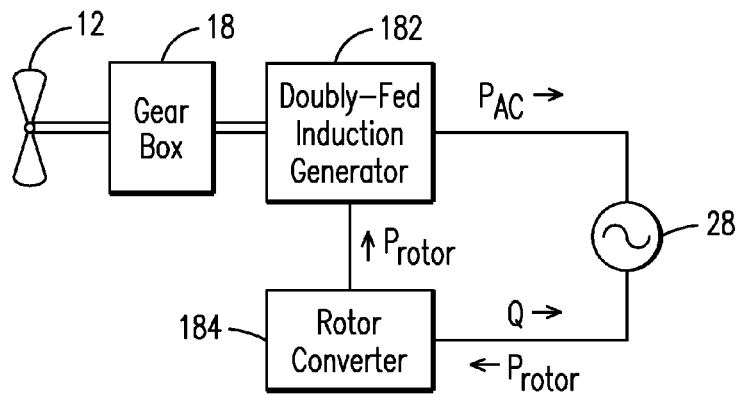

FIG. 5 illustrates another wind turbine design including a doubly-fed induction generator (DFIG) 180, with a rotor converter 184 supplying power ($P_{rotor}$) to a rotor winding of the DFIG 180. A stator of the DFIG connects directly to the grid 28. The rotor converter 184 also may also generate reactive power Q as illustrated, without providing real power. The rotor converter is typically about one-third the size of a generator-side or line-side converter used in other wind turbine systems.

Figure 6:
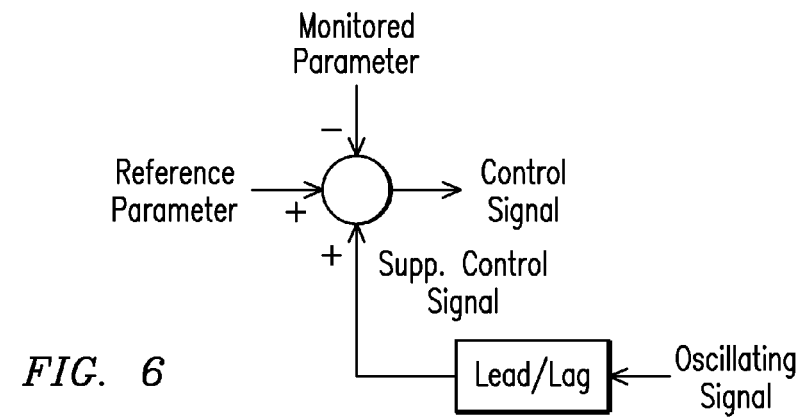
FIG. 6 is a block diagram of a controller according to the present invention.

A control scheme for controlling the line side converter or rotor converter, as described above, is described with reference to FIG. 6. A reference parameter (frequency, real power, integral of accelerating power, or any other quantity as known by those skilled in the art), a monitored (controlled) parameter and a supplemental control signal are input to a combiner 200. A lead or lag term may be associated with the supplemental control signal as indicated. The resulting combined signal, referred to as a control signal, is used to control the converter. For example, the control signal may control a voltage regulator to produce a desired voltage signal to damp the undesired oscillations. As is known to those skilled in the art, various power system parameters can be used to generate the control signal.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:
1. A wind turbine for controlling power oscillations associated with groups of generators or generating plants interspersed on a grid of a power system, the power oscillations created following power system disturbances, the wind turbine comprising:
　rotor blades for turning by the wind;
　an electric generator coupled to the rotor blades; and
　a power converter responsive to electricity generated by the electric generator, the power converter comprising a full conversion power converter for converting the generated electricity to a frequency and voltage for supply to the power grid,
　the full conversion power converter for regulating grid voltage to damp the power oscillations associated with said groups of generators or generating plants interspersed on the grid,
　when the wind turbine is on-line irrespective of whether or not is producing real power, the regulating of the grid voltage to damp the power oscillations being performed by the full conversion power converter by way of voltage regulating,
　when the wind turbine is producing real power, the regulating of the grid voltage to damp the power oscillations being performed by the full, conversion power converter by way of real power modulating with or without voltage regulating.

2. The wind turbine of claim 1 further comprising a fixed speed wind turbine or a variable speed wind turbine.

3. The wind turbine of claim 1 wherein the electric generator comprises a doubly fed induction generator.

4. The wind turbine of claim 3 wherein the doubly-fed induction generator comprises stator windings and rotor windings, the stator windings responsive to a current supplied to or from the grid and from which real power flows by action of the rotor windings turned by action of the rotor blades.

5. The wind turbine of claim 1 wherein the power converter is responsive to a control signal indicative of the power oscillations on the grid.

6. The wind turbine of claim 5 wherein the control signal is generated responsive to one of frequency, electric power, accelerating power, and an integral of accelerating power.

7. The wind turbine of claim 1 wherein the power converter comprises a line side power converter, the wind turbine further comprising a generator side power converter.

8. The wind turbine of claim 1 wherein the electric generator comprises an induction generator or a synchronous generator.

9. The wind turbine of claim 1, wherein the power oscillations comprise inter-area power oscillations.

10. The wind turbine of claim 1, wherein the power oscillations comprise a frequency in a range from 0.1 Hz to 0.7 Hz.

11. A method for controlling power oscillations associated with groups of generators or generating plants interspersed on a grid of a power system, the power oscillations created following power system disturbances, the method comprising:

generating electricity by rotation of an electric generator rotatably coupled to rotor blades of a wind turbine, wherein wind energy causes rotation of the rotor blades;

converting, the electricity to a frequency and voltage suitable for supply to a power grid by operation of a full conversion power converter; and with the full conversion power converter, regulating grid voltage and/or modulating real power to damp the power oscillations associated with said groups of generators or generating plants interspersed on the grid, when the wind turbine is on-line irrespective of whether or not is producing real power, the regulating of the grid voltage to damp the power oscillations being performed by the full conversion power converter by way of voltage regulating, when the wind turbine is producing real power, the regulating of the grid voltage to damp the power oscillations being performed by the full conversion power converter by way of real power modulating with or without voltage regulating.

12. The method of claim 11, wherein the power oscillations comprise inter-area power oscillations.

* * * * *